(12) United States Patent
Campton et al.

(10) Patent No.: US 11,448,269 B2
(45) Date of Patent: Sep. 20, 2022

(54) PAWL CLUTCH WITH PAWL REJECTION FEATURE

(71) Applicant: BorgWarner Inc., Auburn Hills, MI (US)

(72) Inventors: Calahan B. Campton, Royal Oak, MI (US); Michael W. Campbell, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 95 days.

(21) Appl. No.: 16/491,925

(22) PCT Filed: Mar. 7, 2018

(86) PCT No.: PCT/US2018/021253
§ 371 (c)(1),
(2) Date: Sep. 6, 2019

(87) PCT Pub. No.: WO2018/165231
PCT Pub. Date: Sep. 13, 2018

(65) Prior Publication Data
US 2021/0140494 A1 May 13, 2021

Related U.S. Application Data

(60) Provisional application No. 62/468,759, filed on Mar. 8, 2017.

(51) Int. Cl.
*F16D 41/14* (2006.01)
*F16D 41/16* (2006.01)
*F16D 41/12* (2006.01)

(52) U.S. Cl.
CPC .............. *F16D 41/12* (2013.01); *F16D 41/14* (2013.01); *F16D 41/16* (2013.01)

(58) Field of Classification Search
CPC .................................................. F16D 41/12–16
See application file for complete search history.

(56) References Cited

U.S. PATENT DOCUMENTS 8,033,372 B2 * 10/2011 Chiesa .................... F16D 41/12
192/46
9,181,993 B1 11/2015 Corselti et al.
(Continued)

FOREIGN PATENT DOCUMENTS

WO    WO 2010056497        5/2010

OTHER PUBLICATIONS

International Search Report from counterpart Application No. PCT/US2018/021253; report dated Jun. 27, 2018.

*Primary Examiner* — David R Morris
(74) *Attorney, Agent, or Firm* — von Briesen & Roper, s.c.

(57) ABSTRACT

A pawl clutch may include first member having at least one notch, and a second member. The first member and the second member may be configured to rotate relative to each other at a speed differential when the pawl clutch is disengaged. The pawl clutch may further include at least one pawl moveably retained to the second member and having a toe portion configured to engage the pawl clutch by engaging the notch of the first member. The toe portion of the pawl may have a chamfered edge configured to contact a corner of the notch to reject engagement of the pawl with the notch when the speed differential is above a threshold.

20 Claims, 6 Drawing Sheets

(56) References Cited

U.S. PATENT DOCUMENTS

| | | | |
|---|---|---|---|
| 9,657,791 B2* | 5/2017 | Corsetti | F16D 41/30 |
| 10,145,428 B2* | 12/2018 | Pawley | F16D 41/125 |
| 11,162,543 B2* | 11/2021 | Peglowski | F16D 41/12 |
| 2006/0278487 A1* | 12/2006 | Pawley | F16D 41/125 |
| | | | 192/43.1 |
| 2009/0145718 A1* | 6/2009 | Chiesa | F16D 41/12 |
| | | | 192/41 A |
| 2013/0062151 A1 | 3/2013 | Pawley | |
| 2015/0176662 A1* | 6/2015 | Lee | F16D 25/061 |
| | | | 192/85.18 |
| 2015/0354640 A1 | 12/2015 | Papania | |
| 2016/0017937 A1* | 1/2016 | McConnell | F16D 41/12 |
| | | | 192/45.1 |
| 2016/0265609 A1* | 9/2016 | Corsetti | F16D 41/30 |
| 2016/0305495 A1 | 10/2016 | Itagaki | |
| 2021/0140493 A1* | 5/2021 | Peglowski | F16D 7/048 |

\* cited by examiner

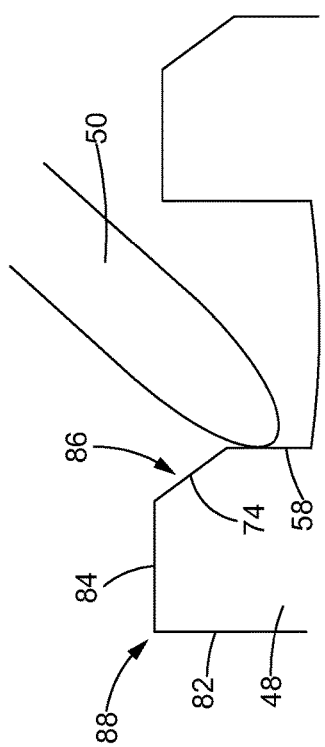
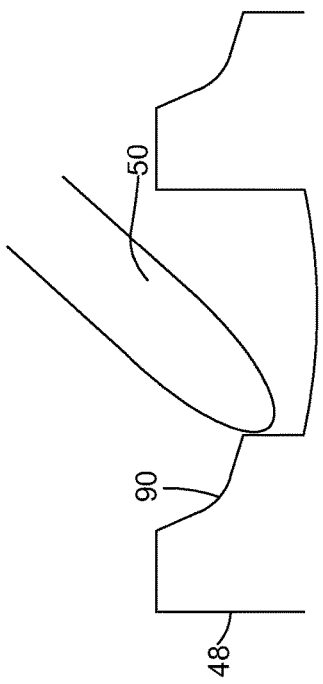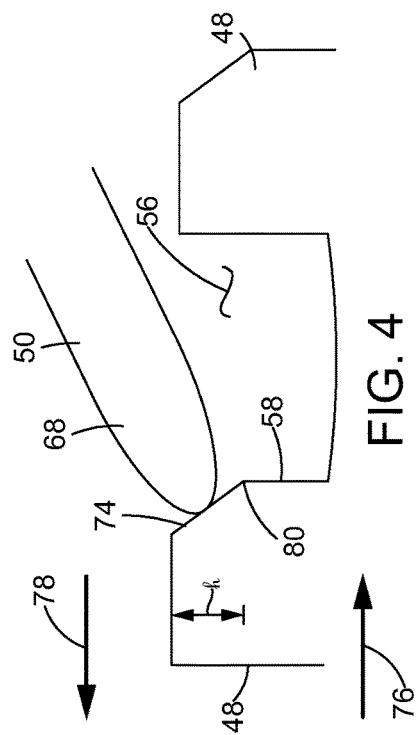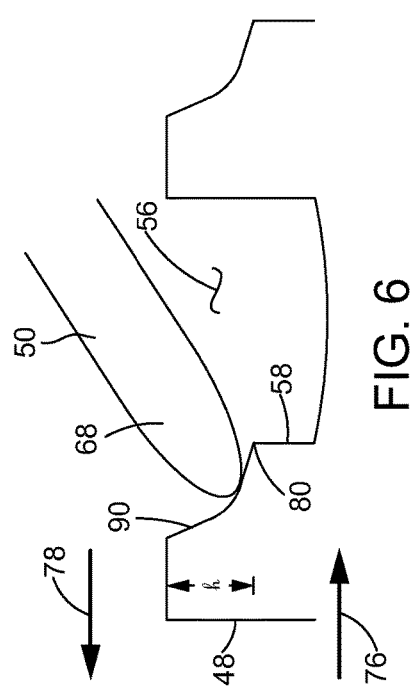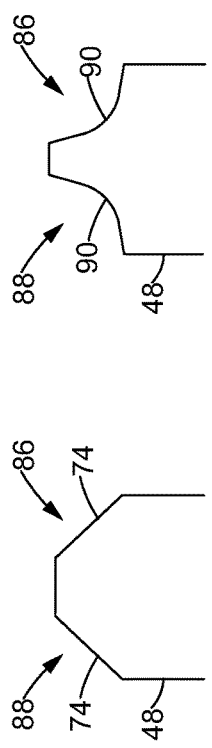

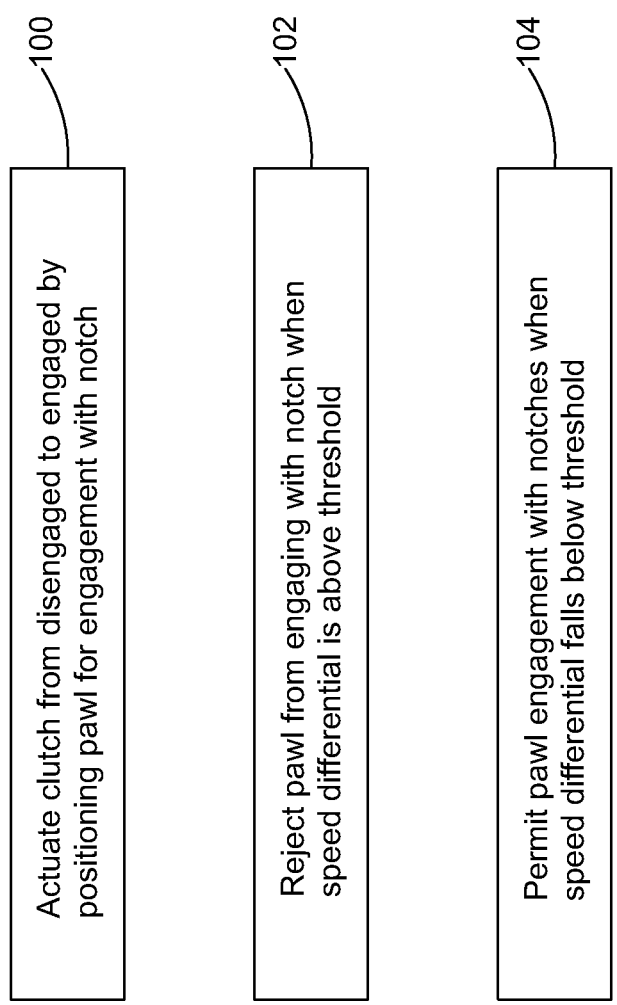

PAWL CLUTCH WITH PAWL REJECTION FEATURE

TECHNICAL FIELD

The present disclosure generally relates to pawl clutches and, more specifically, to pawl clutches having features that reject a pawl from engagement above a speed differential threshold.

BACKGROUND

Pawl clutches may be used to transfer torque in a variety of machines such as, but not limited to, automobiles, trucks, bicycles, gas turbine engines, appliances, and electronic devices. For instance, pawl clutches may be selectively engaged and disengaged to transfer torque between a driving member (e.g., an engine crankshaft) and a driven member (e.g., a drive shaft) at a particular gear ratio. Pawl clutches may include two members configured to rotate independently of each other when the pawl clutch is disengaged, and a pawl that mechanically engages a notch of one of the members to couple or "lock" the rotations of the two members when the pawl clutch is engaged.

A multi-mode clutch module (MMCM) is a type of a pawl clutch that may be used in automatic vehicles in place of friction clutches. For example, MMCMs may be incorporated into the transmission interposed between the engine and the driveshaft to facilitate gear ratio changes. MMCMs may reduce viscous drag losses compared to friction clutches, allowing for reduced spin losses and better fuel economy. An MMCM may include a first rotatable race coupled to a driving member, a second rotatable race coupled to a driven member, and pawls fixedly attached to either the first race or the second race. When the clutch is disengaged, the first and second races may rotate independently of each other (or "freewheel"), a condition referred to as overrunning. To engage the clutch, an actuator may reposition the pawls for engagement with notches of the other of the two races. Once the pawls are engaged with the notches, the rotation of the first and second races may be coupled, allowing the transmission of torque from the driving member to the driven member.

However, unlike friction clutches which may slip when the difference in rotation speed between the discs is too high, pawl clutches may exhibit discrete engagement and disengagements. As a result, accidental or intentional engagement of a pawl clutch may cause damage to the clutch and other components of the system (e.g., the transmission, vehicle components, etc.) if the difference in speed between the two rotatable members is too high when engagement occurs. Accidental engagement of a pawl clutch may occur, for example, if the actuator is unintentionally activated through vibrations or a short circuit.

U.S. Patent Application Publication Number 2013/0062151 discloses a race of a pawl clutch having a notch with a convex surface that urges a pawl away from engagement above a predetermined RPM. While effective, engineers are continuing to seek additional strategies that reduce or eliminate pawl engagement when the difference in rotational speed between the rotatable members is above a "safe" threshold. Clearly, there is a need for pawl clutches designed to reject pawl engagement when the speed differential between the rotatable members is too high.

SUMMARY

In accordance with one aspect of the present disclosure, a pawl clutch is disclosed. The pawl clutch may comprise a first member having at least one notch, and a second member. The first member and the second member may be configured to rotate relative to each other at a speed differential when the pawl clutch is disengaged. The pawl clutch may further comprise at least one pawl moveably retained to the second member and having a toe portion configured to engage the pawl clutch by engaging the notch of the first member. The toe portion of the pawl may have a chamfered edge configured to contact a corner of the notch to reject engagement of the pawl with the notch when the speed differential is above a threshold.

In accordance with another aspect of the present disclosure, a multi-mode clutch module (MMCM) is disclosed. The MMCM may comprise a first race and a second race configured to rotate relative to each other at a speed differential when the MMCM is disengaged. The first race may include a plurality of notches each having a corner. The MMCM may further include a plurality of pawls moveably retained to the second race. Each of the pawls may have a toe portion configured to engage the MMCM by engaging one of the notches of the first race. The MMCM may further comprise an actuator configured to actuate 10 engagement of the MMCM by positioning the pawls for engagement with the notches. The toe portions of the pawls may each have a chamfered edge and a tip. The chamfered edges may be configured to contact the corners of the notches to reject engagement of the pawls with the notches when the speed differential is above a threshold. The pawls may be permitted to engage the notches when the speed differential is below the threshold.

In accordance with another aspect of the present disclosure, a method for controlling an engagement of a pawl clutch is disclosed. The pawl clutch may include a first member having at least one notch, a second member, and a pawl moveably retained to the second member. The first member and the second member may be configured to rotate relative to each other at a speed differential when the pawl clutch is disengaged. The method may comprise actuating the pawl clutch from disengaged to engaged by positioning the pawl for engagement with the notch of the first member, and rejecting the pawl from engagement by allowing a chamfered edge at a toe portion of the pawl to strike a corner of the notch when the speed differential is above a threshold. The method may further comprise permitting the pawl to engage the notch when the speed differential falls below the threshold. The engagement of the pawl with the notch may engage the clutch and couple the rotation of the first member with the second member.

These and other aspects and features of the present disclosure will be more readily understood when read in conjunction with the accompanying drawings.

BRIEF DESCRIPTION OF THE DRAWINGS

FIG. 4 is a schematic representation of pawl rejection with a chamfered edge of a notch of the pawl clutch above a speed differential threshold, constructed in accordance with the present disclosure.

FIG. 5 is a schematic representation similar to FIG. 4, but with the pawl being engaged below the speed differential threshold, constructed in accordance with the present disclosure.

FIG. 6 is a schematic representation similar to FIG. 4, but with the pawl being rejected with a concave edge of the notch above the speed differential threshold, constructed in accordance with the present disclosure.

FIG. 7 is a schematic representation similar to FIG. 6, but with the pawl being engaged below the speed differential threshold, constructed in accordance with the present disclosure.

FIG. 8 is a side view of the notch of the pawl clutch having chamfered edges at both corners, constructed in accordance with the present disclosure.

FIG. 9 is a side view similar to FIG. 8, but with the notch having concave edges at both corners, constructed in accordance with the present disclosure.

FIG. 18 is a flowchart of a series of steps that may be involved in controlling the engagement of the pawl clutch, in accordance with a method of the present disclosure.

DETAILED DESCRIPTION

Figure 1:
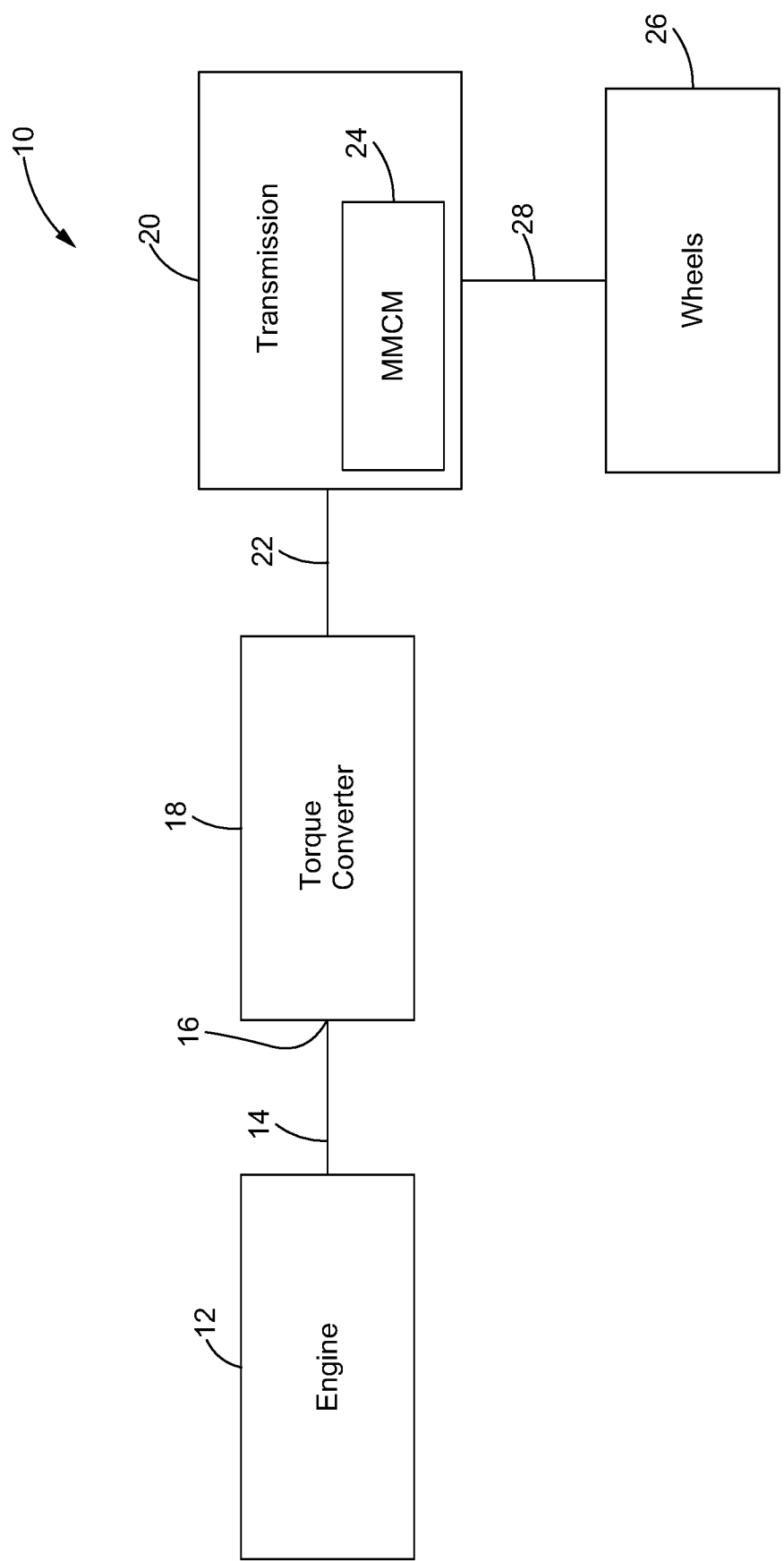
FIG. 1 is a schematic representation an automatic vehicle, constructed in accordance with the present disclosure.

Referring now to the drawings, and with specific reference to FIG. 1, certain components of an automatic vehicle 10 are schematically depicted. The automatic vehicle 10 may include an engine 12 that combusts fuel to drive the rotation of a crankshaft 14. The crankshaft 14 may be coupled to an input 16 of a torque converter 18, and the torque converter 18 may transmit and decouple engine power to a transmission 20 through a turbine shaft 22. The transmission 20 may include one or more planetary gear sets configured to provide various forward and reverse gear ratios, as well as one or more multi-mode clutch modules (MMCMs) 24 configured to facilitate the gear ratio changes in the transmission 20. The transmission 20 may be operatively coupled to drive the wheels 26 of the vehicle 10 via one or more drive shafts 28. It will be understood that the schematic representation of FIG. 1 is simplified may include additional components apparent to those with ordinary skill in the art such as, but not limited to, gears, friction and/or mechanical clutches, shafts, and differentials.

Figure 3:
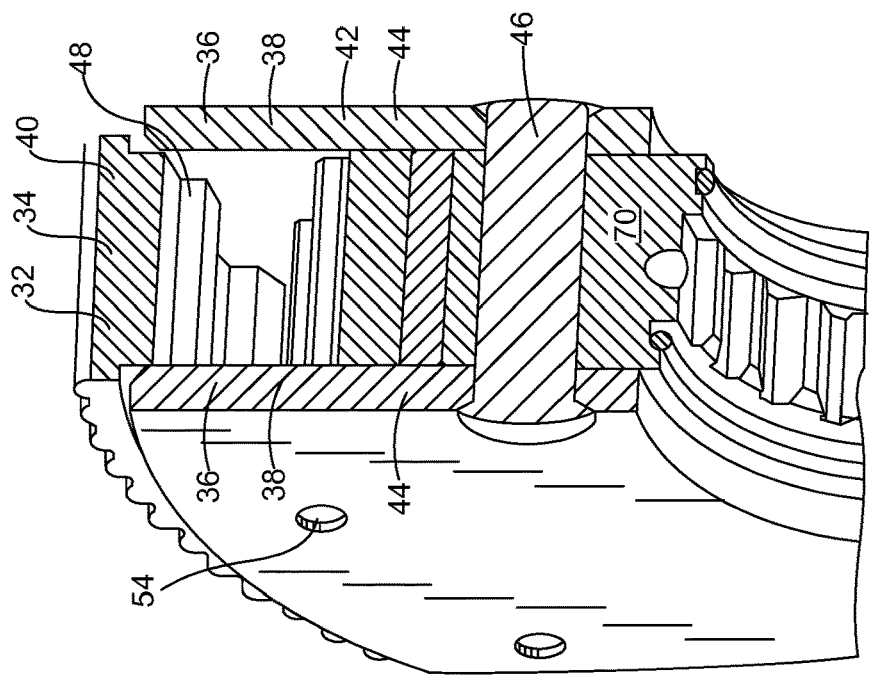
FIG. 3 is a perspective cross-sectional view through the section 3-3 of FIG. 2, constructed in accordance with the present disclosure.
Figure 2:
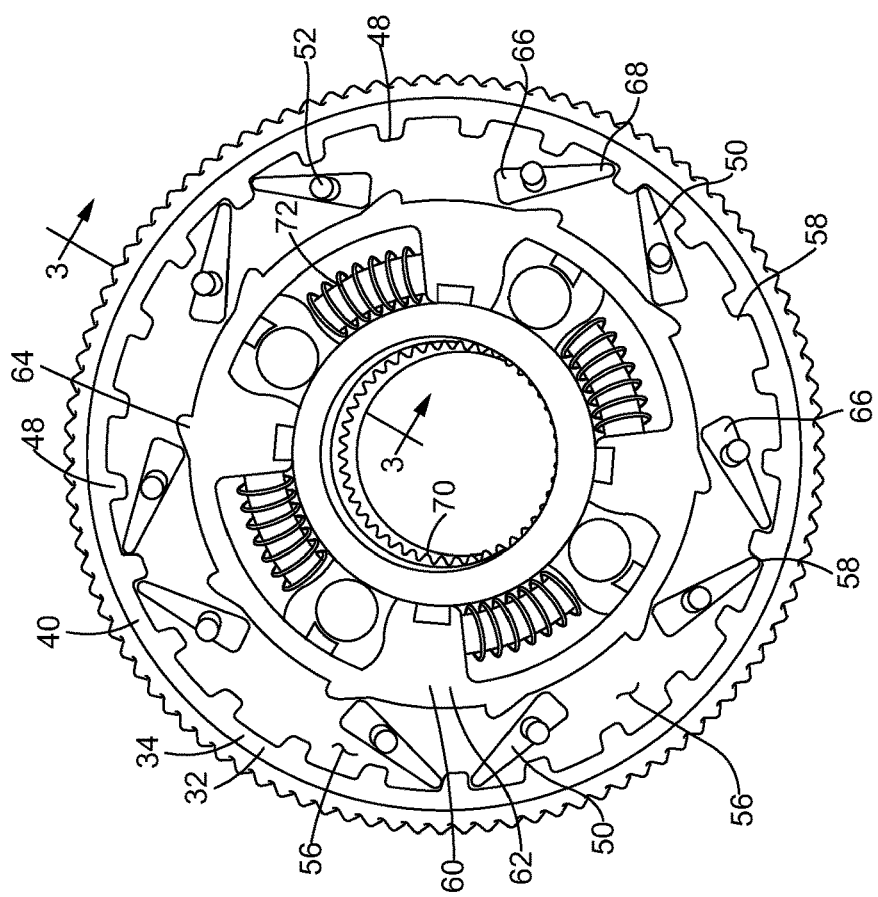
FIG. 2 is a side view of an exemplary pawl clutch of the automatic vehicle with an inner race removed for clarity, constructed in accordance with the present disclosure.

Turning to FIGS. 2-3, an exemplary pawl clutch 30 is shown. The exemplary pawl clutch 30 is the MMCM 24, but may be other types of pawl clutches in alternative arrangements. The MMCM 24 may include a first rotatable member 32, such as a first race 34, and a second rotatable member 36, such as a second race 38, although other types of rotatable members may apply. In the exemplary MMCM of FIGS. 2-3, the first race 34 is an outer race 40, while the second race 38 is an inner race 42. In some arrangements, the second race 38 may be composed of two inner race plates 44 connected by fasteners 46 such as rivets (see FIG. 3). Along an inner circumference of the first race 34 may be one or more notches 48 involved in engagement and disengagement of the MMCM 24, as will be described in further detail below.

The first member 32 may be coupled to a driving member of the transmission 20, and the second member 36 may be coupled to a driven member of the transmission 20, although the opposite configuration may also apply in alternative designs. In a first, disengaged mode of the MMCM 24, the first member 32 and the second member 36 may be permitted to overrun (or "freewheel") and rotate independently of each other at different speeds, not excluding arrangements in which one of the members 32 or 36 is held stationary. In a second, engaged mode of the MMCM 24, the rotations of the first member 32 and the second member 36 may be coupled in both directions to permit transfer of torque from the driving member to the driven member through the MMCM 24.

The MMCM 24 may further include one or more pawls 50 that are moveably retained to the second member 36. For instance, the pawls 50 may be moveably retained to the second member 36 through support bosses 52 received in apertures 54 of the second member 36, although other types of moveable connections may also be used. The pawls 50 may be spring-biased for radial deflection into recesses 56 each defined between two of the notches 48 of the first member 32 to "lock" the rotations of the first member 32 and the second member 36 when the MMCM 24 is engaged. More specifically, each of the pawls 50 may deflect radially into one of the recesses 56 to engage a first side 58 of one of the notches when the MMCM 24 is engaged (also see FIGS. 4-5). Due to the radial deflection of the pawls 50, the MMCM 24 may be a radially-acting clutch.

To actuate engagement and disengagement of the MMCM 24, the MMCM 24 may further include an actuator 60 that rotates between two angular limits to direct the pawls 50 into and out of engagement with the notches 48. In one arrangement, the actuator 60 may be a hydraulically-actuated cam ring 62 having cam ramps 64. For example, in FIG. 2, the cam ring 62 may rotate counter-clockwise from a first angular position in which the pawls 50 are permitted to engage the notches 48, to a second angular position in which the cam ramps 64 move against heel portions 66 of the pawls 50 to deflect toe portions 68 of the pawls 50 out of engagement with the notches 48. Shifting of the cam ring 62 between its angular positions may be hydraulically actuated with an actuator hub assembly 70 which may affect rotation of the cam ring 62 through controlled compression and decompression of springs 72.

When the pawl clutch 30 is disengaged, the first and second members 32 and 36 may be rotating relative to each other at a high speed differential. As used herein, a "speed differential" is the rotational speed difference between the first and second members 32 and 36, taking into account any difference in rotational directions that could amplify the speed difference. If the pawl clutch 30 is shifted from disengagement to engagement when the speed differential between the first and second members 32 and 36 is too high, damage to the clutch 30, the transmission 20, or the vehicle 10 as a whole may result. Accordingly, as described in further detail below, the pawl clutch 30 of the present disclosure may include one or more rejection features to reject the pawls 50 from engagement with the notches 48 when the speed differential is above a given threshold. The speed differential threshold at which the pawls 50 are rejected may be predetermined according to a speed differential above which it is considered potentially damaging to engage the clutch 30. Thus, in practice, the speed differential threshold may vary in different system designs. In addition, the speed differential threshold may have tolerance limits and may include a range of speed differentials.

One strategy for rejecting pawl engagement above the speed differential threshold is depicted in FIG. 4. In this arrangement, one or more of the notches 48 of the first member 32 may have a chamfered edge 74 that prevents the pawl 50 from deflecting into the recess 56 and engaging the first side 58 of the notch 48 above the speed differential threshold. More specifically, the chamfered edge 74 may have a height (h) that controls how far the pawl 50 deflects into the recess 56 at a given speed differential when the first member 32 is rotating in a direction 76 and/or the second member 36 is rotating in a direction 78. Above the speed differential threshold, the pawl 50 may be blocked from deflecting further into the recess 56 than a lower end point 80 of the chamfered edge 74. This prevents the toe portion 68 from contacting the first side 58 of the notch 48 and being trapped by the first side 58 in the recess 56. To discourage engagement, the chamfered edge 74 may strike and exert a reaction force on the toe portion 68 as the pawl 50 deflects, possibly temporarily redirecting the pawl 50 in the opposite direction. The height (h) and slope of the chamfered edge 74 may be determined based on the how far the pawl 50 is expected to deflect toward the recess 56 at a given speed differential threshold according to its spring rate and the distance between the notches 48. The speed differential at which pawl rejection occurs may be tuned by the height (h) and/or the slope of the chamfered edge 74. For example, rejection of the pawls 50 may occur at higher speed differentials when the chamfered edges 74 have greater heights (h).

Referring to FIG. 5, each of the notches 48 may have the first side 58 that is configured to engage the pawl 50, a second side 82, and an upper edge 84 extending between the first side 58 and the second side 82. The first side 58 may have a first corner 86 and the second side 82 may have a second corner 88. In one arrangement, the chamfered edge 74 may be located at the first corner 86 of the notch 48 near the first side 58 that engages in pawl 50, as shown in FIGS. 4-5. Alternatively, if both the first side 58 and the second side 82 are configured to engage a pawl, the notch 48 may have chamfered edges 74 at both of the first and second corners 86 and 88 (see FIG. 8).

Referring again to FIG. 5, when the speed differential between the first and second members 32 and 36 is below the threshold, the chamfered edge 74 may permit the pawl 50 to engage the notch 48. That is, when the speed differential falls below the threshold, the pawl 50 may have sufficient time to deflect past the lower end point 80 of the chamfered edge 74 and contact the first side 58 of the notch 48 for engagement. Accordingly, by virtue of the chamfered edges 74, the pawl clutch 30 may be protected from engagement when the speed differential is above a threshold considered threatening to the clutch 30, and it may be permitted to engage when the speed differential at a level considered safe to engage the clutch 30.

Alternatively, the notches 48 may have concave edges 90 as shown in FIG. 6. The concave edge 90 may function similarly to the chamfered edge 74 of FIGS. 4-5, but may exhibit a softer impact with the pawl 50 than the chamfered edge 74. As with the chamfered edge 74, the concave edge 90 may have a height (h) that controls how far the pawl 50 is permitted to deflect into the recess 56 at above the speed differential threshold when the first member 32 is rotating in the direction 76 and/or the second member 36 is rotating in the direction 78. Specifically, when the speed differential is above the threshold, the toe portion 68 of the pawl 50 may be caught on the concave edge 90, blocking the pawl 50 from deflecting past the lower end point 80 of the concave edge 90. Consequently, the toe portion 68 may be blocked from making contact with the first side 58 of the notch 48 that traps the pawl 50 in the recess 56. As the speed differential decreases below the threshold, the pawl 50 may have sufficient time to deflect past the lower end point 80 of the concave edge 90 for engagement with the first side 58 of the notch 48. As with the chamfered edge 74, the concave edge 90 may be located at the first corner 86 of the notch 48 that is near the first side 58 that engages the notch 48. If, however, both the first side 58 and the second side 82 of the notch 48 participate in an engagement with a pawl, the notch 48 may have the concave edge 90 at both the first corner 86 and the second corner 88, as shown in FIG. 9. In other embodiments, the notches 48 may have the chamfered edge 74 at one of the two corners 86 and 88, and the concave edge 90 at the other of the two corners 86 and 88. As yet another possibility, some of the notches 48 of the pawl clutch 30 may have chamfered edges 74, and some of the notches 48 of the pawl clutch 30 may have concave edges 90.

Figure 10:
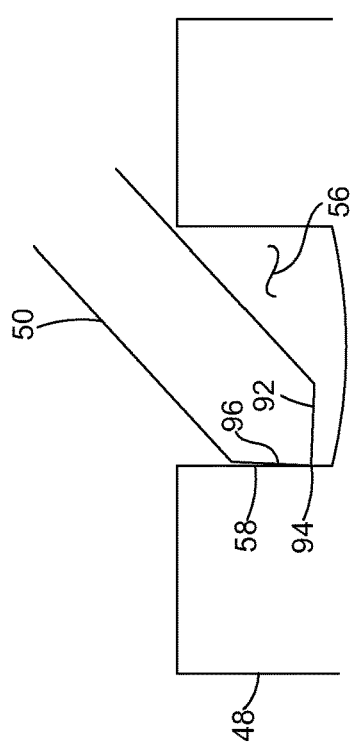
FIG. 10 is a schematic representation of pawl rejection above a speed differential threshold with a chamfered edge at a toe portion of the pawl, constructed in accordance with the present disclosure.
Figure 14:
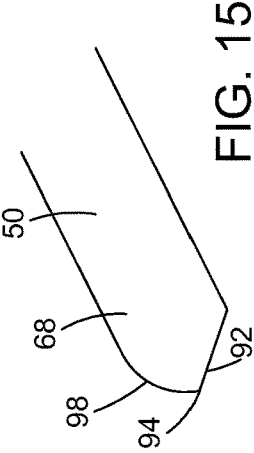
FIG. 14 is a side view of the pawl with the toe portion having the chamfered edge and a rounded tip, constructed in accordance with the present disclosure.

Another strategy for rejecting pawl engagement above the speed differential threshold is depicted in FIG. 10. In this arrangement, the toe portion 68 of the pawl 50 may have a chamfered edge 92 that extends to a tip 94, and the first corner 86 of the notch 48 may be sharp. The tip 94 of the pawl 50 may be pointed, although it may be rounded with a radius in some circumstances as well (see FIG. 14). When the speed differential is above the threshold, the chamfered edge 92 may strike the corner 86 of the notch 48 to block the pawl 50 from deflecting into the recess 56 and engaging the notch 48. Thus, the tip 94 of the pawl 50 may be restricted to a position above the upper edge 84 of the notch 48 when the speed differential is above the threshold. As the speed differential decreases below the threshold, the tip 94 of the pawl 50 may have sufficient time to deflect past the corner 86 and into the recess 56 to allow the toe portion 68 to contact the first side 58 of the notch 48 (see FIG. 11). The slope and height of the chamfered edge 92 may be designed such that the tip 94 may not be able to deflect past the corner 86 and into the recess 56 above the predetermined speed differential threshold.

Figure 11:
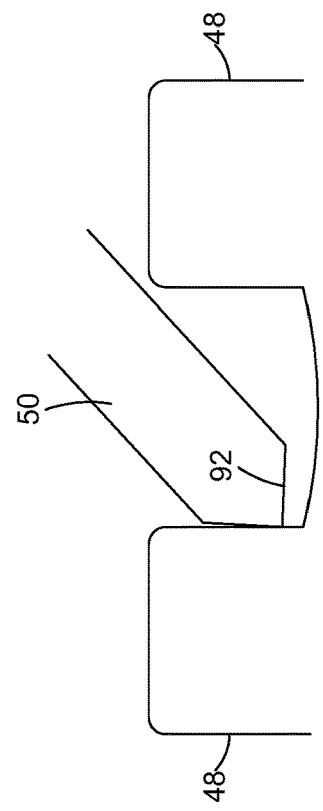
FIG. 11 is a schematic representation similar to FIG. 10, but with the pawl being engaged below the speed differential threshold, constructed in accordance with the present disclosure.
Figure 15:
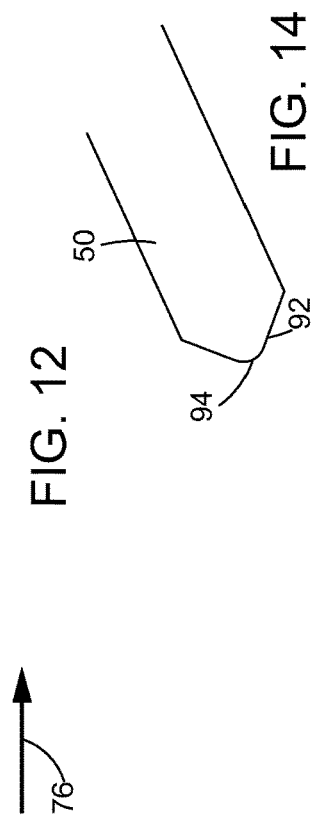
FIG. 15 is a side view of the pawl with the toe portion having the chamfered edge and a rounded edge, constructed in accordance with the present disclosure.

The toe portion 68 of the pawl 50 may have a second chamfered edge 96 that joins with the chamfered edge 92 at the tip 94, and the second chamfered edge 96 may contact the first side 58 of the notch 48 when the pawl 50 is engaged with the notch 48 (see FIG. 11). Alternatively, the toe portion 68 of the pawl 50 may have a rounded edge 98 that joins with the chamfered edge 92 at the tip 94, and the rounded edge 98 may contact the first side 58 upon pawl engagement with the notch 48 (see FIG. 15).

Figure 12:
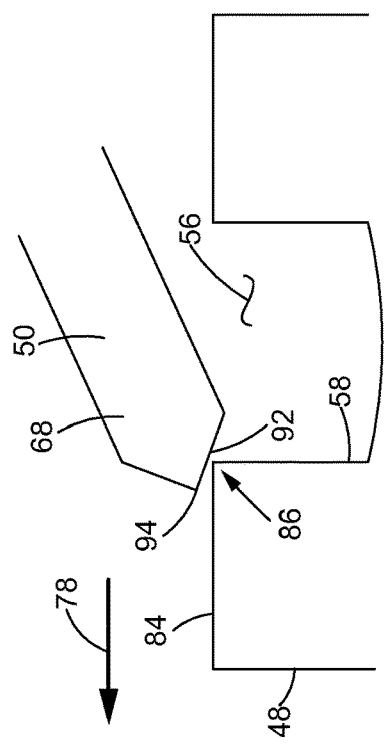
FIG. 12 is a schematic representation similar to FIG. 10, but with the notches having convex corners, constructed in accordance with the present disclosure.
Figure 13:
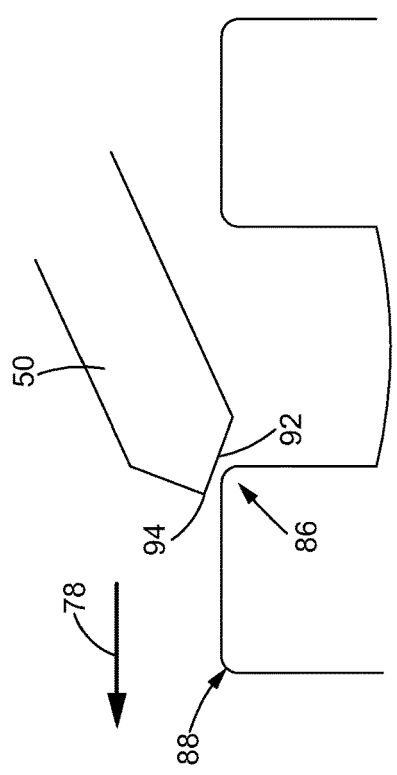
FIG. 13 is a schematic representation similar to FIG. 12, but with notches having convex corners, constructed in accordance with the present disclosure.

In an alternative arrangement depicted in FIGS. 12-13, the first corner 86 of the notch 48 may have a rounded or convex shape. The rounded or convex corner of the notch 48 may exhibit a softer impact with the chamfered edge 92 than the sharp notch corner of FIGS. 10-11. The notches 48 of the first member 32 may be rounded or convex at only the first corner 86, or may be rounded/convex at both the first and second corners 86 and 88. In other arrangements, the notches 48 may have one sharp corner and one round/convex corner, or some of the notches 48 may have sharp corners and some of the notches 48 may have round/convex corners.

Figure 17:
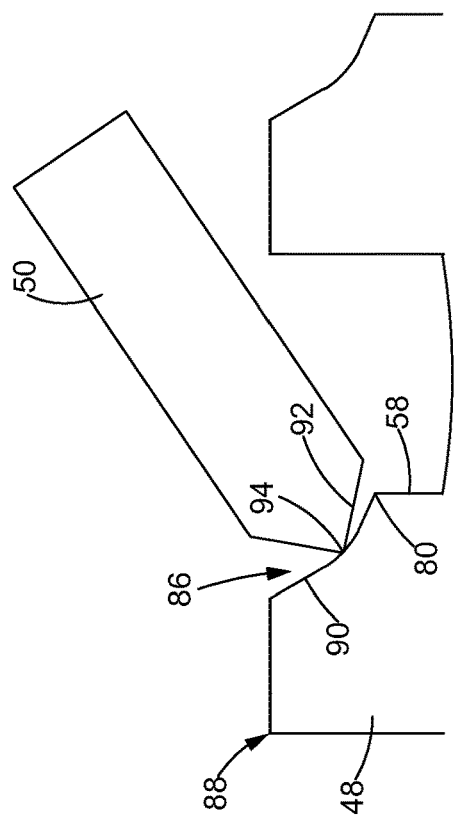
FIG. 17 is a schematic representation similar to FIG. 16, but with the notch having a concave edge, constructed in accordance with the present disclosure.
Figure 16:
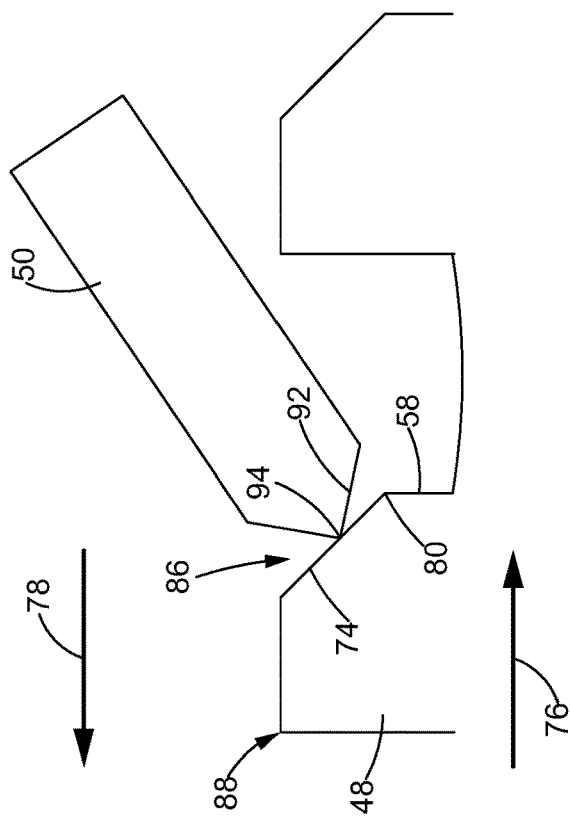
FIG. 16 is a schematic representation of pawl rejection above the speed differential threshold with both the notch and the pawl having chamfered edges, constructed in accordance with the present disclosure.

As yet another possibility, the pawl clutch 30 may have pawl rejection features at both the notch 48 and the pawl 50 (see FIGS. 16-17). For instance, the notch 48 may have the chamfered edge 74 (FIG. 16) or the concave edge 90 (FIG. 17) at the first corner 86, and the pawl 50 may have the chamfered edge 92 at the toe portion 68. In such arrangements, the tip 94 of the pawl 48 may strike the chamfered edge 74 or the concave edge 90 of the notch 48 above the speed differential threshold to reject the pawl 50 from engagement. Above the speed differential threshold, the tip 94 may not deflect past the lower end point 80 of the chamfered edge 74 or the concave edge 90. Below the speed differential threshold, the tip 94 may deflect past the lower end point 80, permitting the toe portion 68 of the pawl 50 to contact the first side 58 of the notch 48, as described above. Various other combinations of the disclosed embodiments also fall within the scope of the present disclosure. For instance, other variations may include a combination of chamfered edges and concave edges at either or both of the first corners 86 and the second corners 88 of the notches 48. In such arrangements, the toe portions 68 of the pawls 50 may have a rounded edge (see FIGS. 4-7), two chamfered edges (see FIGS. 10-13), or a rounded edge and a chamfered edge (see FIG. 15).

It is further noted here the MMCM 24 depicted in FIGS. 2-3 is but one example of a pawl clutch in which the pawl rejection features of the present disclosure may be implemented. It will be understood that the concepts of the present disclosure may be applied to any type of pawl clutch, such as less complex pawl clutches or other types of MMCMs. For instance, other types of MMCMs may be used in which the pawls engage with notches of the inner race, rather than the outer race. In addition, other types of MMCMs having more complex operational modes, such as those that permit freewheeling in one rotation direction and engagement in another rotation direction, may also be used. The pawl rejection features disclosed herein may also be implemented in axially-acting pawl clutches, as those with ordinary skill in the art will appreciate. Moreover, the pawl rejection features may be applied to either rotating pawl clutches in which both members rotate before engagement, or stationary pawl clutches in which one of the members is held stationary prior to engagement.

INDUSTRIAL APPLICABILITY

In general, the teachings of the present disclosure may find broad applicability in many industries including, but not limited to, automotive, single-track vehicle, marine, electronic, and transportation industries. In particular, the present disclosure may find applicability in any industry using machines or equipment that include pawl clutches.

Turning now to FIG. 18, a method of controlling engagement of the pawl clutch 30 in accordance with the present disclosure is shown. At a first block 100, the pawl clutch 30 may be actuated from disengaged (with the first member 32 and the second member 36 rotating independently of each other) to engaged. Namely, the actuator 60 may re-position the pawls 50, priming the pawls 50 for engagement with the notches 48 of the first member 32. In the example of FIGS. 2-3, the block 100 may involve rotating the cam ring 62 from a position in which the cam ramps 64 impinge on the heel portions 66 of the pawls 50 to a position in which the cam ramps 64 permit radial deflection of the pawls 50 towards the notches 48. However, it will be understood that any suitable pawl clutch actuator may be used to carry out the block 100, and may vary considerably depending on the type of pawl clutch used. Once clutch engagement is actuated with the actuator, the toe portions 68 of the pawls 50 may begin deflection toward engagement with the notches 48 of the first member 32.

According to a next block 102, the pawls 50 may be rejected from engagement with the notches 48 when the speed differential between the first member 32 and the second member 36 is above the predetermined threshold. In one arrangement, the block 102 may involve using the chamfered edges 74 and/or the concave edges 90 of the notches 48 to block deflection of the pawls 50 past the lower end points 80 of the notches 48 (see FIGS. 4 and 6). In another arrangement, the block 102 may involve using the chamfered edges 92 at the toe portions 68 of the pawls 50 to prevent deflection of the pawls 50 past the corners 86 of the notches 48 (see FIGS. 10 and 12). Other suitable arrangements to achieve pawl rejection may involve a combination of chamfered and/or concave edges at the corners (86 and/or 88) of the notches 48, and chamfered edges at the toe portions 68 of the pawls 50 (see FIGS. 16-17).

According to a next block 104, the pawls 50 may be permitted to engage the notches 48 when the speed differential falls below the threshold. That is, as the speed differential between the first and second members 32 and 36 falls below the threshold, the pawls 50 may have sufficient time to deflect past the chamfered edges 74 and/or concave edges 90 into the recesses 56 where the toe portions 68 may contact the first sides 58 of the notches 48 for engagement (see FIGS. 5 and 7). Alternatively, if the toe portions 68 of the pawls 50 include the chamfered edge 92, the block 104 may involve allowing the tips 94 of the pawls 50 to deflect past the corners of the notches 48 so that the toe portions 68 make contact with the first sides 58 of the notches 48 (see FIGS. 11 and 13).

The pawl clutch disclosed herein includes rejection features at one or both of the notches and the pawls that prevent pawl engagement when the speed differential between the first and second members is above a threshold level considered safe for engagement. In one implementation, the corners of the notches may have chamfered or concave edges that catch the pawls on the notch corners as the pawls attempt to deflect into the recesses between the notches for engagement. In another implementation, the toe portions of the pawls may have chamfered edges that impinge on the corners of the notches as the pawls attempt to deflect into the recesses for engagement. As the speed differential decreases to a level considered safe for engagement, the pawls may be permitted to deflect past the corners of the notches and engage the notches, resulting in coupled rotation of the first and second members. As disclosed herein, the speed differential range at which pawl rejection occurs may be tuned by the height and/or slopes of the chamfered or concave edges.

It is expected that the technology disclosed herein may find wide applicability in a wide range of areas such as, but not limited to, automotive, transportation, electronic, appliance, and other machine applications.

What is claimed is:

1. A pawl clutch, comprising:
   a first member having at least one notch;
   a second member, the first member and the second member being configured to rotate relative to each other at a speed differential when the pawl clutch is disengaged, the speed differential corresponding to a difference between a rotational speed of the first member and a rotational speed of the second member; and
   at least one pawl moveably retained to the second member, each pawl having a toe portion configured to engage the pawl clutch by engaging the notch of the first member, the toe portion of the pawl having a chamfered edge configured to contact a corner of the notch to reject engagement of the pawl with the notch when the speed differential is above a threshold, wherein the chamfered edge is planar and extends to a tip of the pawl, and each pawl has a heel portion opposite the toe portion configured to impinge a portion of a cam ring.

2. The pawl clutch of claim 1, wherein the corner of the notch is sharp.

3. The pawl clutch of claim 1, wherein the corner of the notch is rounded.

4. The pawl clutch of claim 1, wherein the corner of the notch is convex.

5. The pawl clutch of claim 1, wherein the corner of the notch has a chamfered edge.

6. The pawl clutch of claim 1, wherein the corner of the notch has a concave edge.

7. The pawl clutch of claim 1, wherein the toe portion of the pawl further includes a rounded edge that joins with the chamfered edge at the tip, and wherein the tip is configured to deflect past the corner of the notch to allow the rounded edge to contact a first side of the notch when the speed differential is below the threshold.

8. The pawl clutch of claim 1, wherein the toe portion of the pawl further includes a second chamfered edge that joins with the chamfered edge at the tip, and wherein the tip is configured to deflect past the corner of the notch to allow the second chamfered edge to contact a first side of the notch when the speed differential is below the threshold.

9. The pawl of claim 1, wherein the pawl clutch is a radial pawl clutch.

10. A multi-mode clutch module (MMCM), comprising:
    a first race including a plurality of notches each having a corner;
    a second race, the first race and the second race being configured to rotate relative to each other at a speed differential when the MMCM is disengaged, the speed differential corresponding to a difference between a rotational speed of the first race and a rotational speed of the second race;
    a plurality of pawls moveably retained to the second race, each of the pawls having a toe portion configured to engage the MMCM by engaging one of the notches of the first race, each pawl having a heel portion opposite the toe portion configured to impinge a portion of a cam ring; and
    an actuator configured to actuate engagement of the MMCM by positioning the toe portions of the pawls for engagement with the notches, the toe portions of the pawls each having a chamfered edge, wherein the chamfered edge is planar and extends to a tip of the pawl, the chamfered edges being configured to contact the corners of the notches to reject engagement of the pawls with the notches when the speed differential is above a threshold, the pawls being permitted to engage the notches when the speed differential is below the threshold.

11. The MMCM of claim 10, wherein the corners of the notches are sharp.

12. The MMCM of claim 10, wherein the corners of the notches are rounded.

13. The MMCM of claim 10, wherein the corners of the notches are convex.

14. The MMCM of claim 10, wherein the corners of the notches each have a chamfered edge.

15. The MMCM of claim 10, wherein the corners of the notches each have a concave edge.

16. The MMCM of claim 10, wherein the toe portion of the pawl further includes a rounded edge that joins with the chamfered edge at the tip.

17. The MMCM of claim 10, wherein the toe portion of the pawl further includes a second chamfered edge that joins with the chamfered edge at the tip.

18. The MMCM of claim 10, wherein each of the notches includes a first side having the corner, a second side, and an upper edge extending between the first side and the second side, and wherein the tip is restricted to a position above the upper edge when the speed differential is above the threshold.

19. A method for controlling an engagement of a pawl clutch, the pawl clutch including a first member having at least one notch, a second member, and a pawl moveably retained to the second member, the first member and the second member being configured to rotate relative to each other at a speed differential when the pawl clutch is disengaged, the method comprising:
    actuating the pawl clutch from disengaged to engaged by positioning the pawl for engagement with the notch of the first member;
    rotating a cam ring until a cam ramp impinges a heel portion of the pawl
    rejecting the pawl from engagement with the notch by allowing a planar chamfered edge at a toe portion of the pawl to strike a corner of the notch when the speed differential is above a threshold, the planar chamfered edge extending to a tip of the pawl, the speed differential corresponding to a difference between a rotational speed of the first member and a rotational speed of the second member; and
    permitting the pawl to engage the notch when the speed differential between the first member and the second member falls below the threshold, the engagement of the pawl with the notch engaging the pawl clutch and coupling rotation of the first member and the second member.

20. The method of claim 19, wherein permitting the pawl to engage the notch comprises permitting the tip to deflect past the corner of the notch.

* * * * *